Patented July 13, 1943

2,324,427

UNITED STATES PATENT OFFICE 2,324,427

ABRASIVE PRODUCT

Norman P. Robie, Lewiston, N. Y., assignor to The Carborundum Company, Niagara Falls, N. Y., a corporation of Delaware No Drawing. Original application August 17, 1940, Serial No. 353,065. Divided and this application April 29, 1942, Serial No. 441,020

6 Claims. (Cl. 51—298)

This invention relates to abrasive products such as abrasive paper and cloth, polishing set-up wheels and grinding wheels, and to methods of manufacturing the same. More specifically, the invention is concerned with abrasive articles wherein there is employed as a binder either in whole or in part, a composition which includes a salt of an ethenoid resin. The invention is particularly well-adapted to the production of coated abrasive products such as abrasive paper and cloth and set-up wheels.

This application is a division of my copending application Serial No. 353,065, filed August 17, 1940.

An object of the invention is the provision of improved abrasive articles including an improved binder. Another object of the invention is to provide a coated abrasive article containing a binder which includes as an essential ingredient a synthetic gum which can be taken up in water and consequently can be substituted for glue in the ordinary sandpaper machinery. Another object of the invention is the provision of improved binders for coated abrasives comprising a salt of an ethenoid resin. Other objects will appear from a consideration of the description of the invention as hereinafter set forth.

The ethenoid resins employed in my invention are those formed by the polymerization of compounds containing a double-bonded carbon atom, there being always included in the polymer a substantial proportion of a compound which contains a neutralized organic acid group. Examples of ethenoid resins which are capable of forming salts by neutralization with alkalis and are therefore useful in my invention are the polyacrylic acids; heteropolymers of vinyl or acrylic compounds with olefinic acids, and partial vinyl esters of polybasic acids which contain free acid groups.

Alkalis which may be employed to form, with the acid-containing ethenoid resins, the salts which are used in my invention include the inorganic bases such as sodium, potassium and ammonia, and organic bases such as di- or tri-ethenol amine, the amyl amines and pyridine.

It will thus be seen that there are three specific classes of ethenoid resins which meet the requirements of my improved binder. A common characteristic of the ethenoid resins which are neutralized to form a salt is the presence of a substantial proportion of free organic acid groups in polymers formed from a plurality of unsaturated monomers containing ethylene linkages. Many of the salts, and particularly those formed with water-soluble inorganic bases or amines, are water-soluble. In one case the binders comprise the salts of polymers of an acrylic acid. In the second case, esters are formed by reacting only a part of the carboxyl groups appearing in the monomer with polyvinyl alcohol and neutralizing additional carboxyl groups with alkali to form salts. The third class includes the salts of heteropolymers in which the double bond of an ethenoid linkage is opened up to join a vinyl or acrylic compound containing an acid group and provide a polymer containing organic acid groups in the chain, these latter groups being neutralized with the alkali to form the salt.

Specific compounds of the first class, the salts of which have been found to be suitable in carrying out my invention include polyacrylic acid and polyalpha-methacrylic acid. As is known, compounds of this class can be polymerized by subjecting the monomeric compounds to suitable treatment such as by exposure to ultra violet light or heating or by the employment of a suitable catalyst such as oxidizing agents like hydrogen peroxide.

The second group of compounds suitable for my purposes comprises certain polyvinyl esters of polybasic acids in which only part of the acids are esterified, thus leaving uncombined acid groups which are neutralized. In describing and claiming such esters, I have chosen to refer to such compounds, in which only part of the acid groups in the polybasic acid are esterified, as "partial polyvinyl esters." For example, a polyvinyl ester of a monobasic acid, such as polyvinyl acetate, may be subjected to the action of a polybasic acid so as to replace some or all of the acetic acid groups with polybasic acid groups. Sufficient polybasic acid is used to give the final gum enough free or uncombined carboxylic groups to make it reactive with alkalis to form salts. Suitable polybasic acids for this purpose are citric, tartaric, maleic, oxalic, succinic, malic and phthalic acids. In place of a polycarboxylic acid, I may use a polybasic acid in which one or more of the acid-groups are the sulphonic acid (SO$_3$H) group. The products obtained have widely varying properties depending upon many factors such as the molecular weight of the original polyvinyl acetate, the proportion and type of polybasic acid used, and the time, temperature, solvents and catalysts used in the reaction.

I may also employ the salts of copolymers and heteropolymers of these partial polyvinyl esters of polybasic acids. These may be produced by partial reaction, by partial hydrolysis or by using copolymers and heteropolymers or their components as the raw materials for the production of copolymers and heteropolymers of partial polyvinyl esters of polybasic acids. Still another method of preparing these salts of partial esters is to esterify polyvinyl alcohol with polybasic acids, their anhydrides or their chlorides and neutralize the esters with alkali. It is thus evident that several methods of attaching acid groups to the polyvinyl compound may be used.

The third group comprises the salts of resins formed by the heteropolymerization of a compound containing a vinyl group with an olefine carboxylic acid or a compound capable of forming such an acid. Specific materials containing the vinyl group are styrene or vinyl benzene, and vinyl and acrylic acid esters such as vinyl acetate or chloride and methyl acrylate or methacrylate. Alternatively, the heteropolymers may be hydrolyzed to form heteropolymers of vinyl alcohol with the acids, or the heteropolymer may be preliminarily hydrolyzed and reacted with an aldehyde to form an acetal. Suitable olefine acids and derivatives include maleic, fumaric, crotonic, itaconic and citraconic acids and the anhydrides, chlorides, nitriles and other derivatives capable of conversion to the corresponding acids.

The formation of the polymers may be induced by any of the conventional methods employed in polymerization as by heating, exposure to ultra violet light and the addition of suitable catalysts.

In making abrasive coated products, a coating of liquid adhesive is applied to the backing material, abrasive grains are distributed over the adhesive-coated surface, and the thus-coated article is treated to solidify the liquid adhesive. A second coating of adhesive, usually called a "sizing" coat, is commonly applied after the grains have been attached by the first or "making" coat of adhesive to provide additional binder for the grains. This sizing coat must also be hardened.

In preparing the liquid adhesives used in my invention I first make up a polymer of the acid or acid-containing compound, preferably one having a high molecular weight because such resins are tougher and make better binders, and I then dissolve the polymer in a solution of an alkali. While sufficient alkali to neutralize all of the acid may be used, I have found that solutions may be prepared by using less alkali than is needed to completely neutralize the acid and that both the liquid adhesives and the solidified binders thus prepared are eminently satisfactory for use in the invention.

I have also found that the invention can be carried out by starting with a polymerized derivative of an acid such as a nitrile or a chloride instead of the acid itself. In this modification of my invention the binder comprises in part a salt of the corresponding polyacrylic acid and in part the polymerized derivative. Furthermore by including some ammonia in the water used to dissolve the resins the corresponding polyamides may be formed, thus further modifying the properties of the hardened binder, the characteristics of which depend upon the composition of the solidified binder obtained after the hardening treatment.

The adhesive coating and the abrasive grains may be applied by any of the methods used in the manufacture of coated abrasive articles. For example the adhesive may be applied by passing a moving web between a pair of rolls one of which is rotated while partially immersed in a vat of the liquid. Alternatively the adhesive may be brushed or sprayed onto the backing.

The hardening treatment which is used to solidify and set up the liquid adhesive comprises as an essential step the removal of water. This step may be carried out in the manner commonly used in the manufacture of glue bonded sandpaper where the coated web is festooned and hung in drying chambers which causes evaporation of the water under controlled conditions.

While I have found that articles bonded with these salts of polyacids or polymers containing acid groups are superior for many purposes, my invention includes other modifications or embodiments which constitute additional improvements over the prior art for some purposes. In this modification of the invention the salts of my invention are not used to form the entire binder for the abrasive grains but rather they are modified by the inclusion of other bonds which are compatible with them in both the liquid and the final solid conditions.

I have found that other kinds of binders which have been previously used in the manufacture of abrasive articles may be substituted for a part of the salts which form the principal feature of the invention. Examples of such binders are cellulose derivatives, such as cellulose esters and ethers, and heat hardenable resins as exemplified by phenol-formaldehyde condensation products.

The use of combinations of the salts with these other binders has a number of advantages. For example the salts of polyacrylic acids have been found to be excellent dispersing agents for promoting and stabilizing aqueous dispersions of solutions of esters in organic solvents. Where they are so used the products serve the dual function of acting as a dispersing agent for the esters in the liquid state and plasticizers or modifiers for the esters when they are solidified and are functioning as a binder for the abrasive grains.

Cellulose esters such as cellulose nitrate or acetate have previously been suggested as binders for coated abrasives but so far as applicant is aware they have not been used because it has been necessary to liquefy them by dissolving in organic solvents. These solvents are expensive, explosive, and otherwise undesirable. By dispersing the esters in water with the aid of salts of my invention as the dispersing agent it is unnecessary to use much solvent because the esters can be made dispersible by taking them up in a small amount of solvent and then liquefied to the desired viscosity with water.

As indicated the salts may also be blended with other types of resins to assist in liquefying the resins and to modify their properties when they are in the solid condition and functioning as the binder for the abrasive grains. Phenol-formaldehyde condensation products have been previously proposed as a binder for coated abrasives but they have only been used to a very limited extent because they are relatively inflexible. Some of the lower polymers of the acrylic acids form salts which are relatively flexible and these classes of resins may be advantageously employed in conjunction with the more inflexible resins as exemplified by the hardened phenolic resins.

My invention has a number of advantages over the articles of the prior art. Products made in accordance with the invention have been found to be superior to glue-bonded sandpaper for many purposes. As has been pointed out they are an improvement over articles employing phenolic resins as a binder because they may be made more flexible. Furthermore the binders may be liquefied with water and they therefore can be applied on machinery commonly used in making sandpaper with glue binder. The hazards and expenses coincident to the use of organic solvents are eliminated. They also make it possible to produce coated abrasive articles which are particularly well suited to the treatment of different classes of materials. Heretofore it has been customary to use glue-bonded products on all classes of work and it has not been possible to provide special bonds for special purposes as is commonly done with abrasive wheels. By utilizing different resins of my invention a binder can be prepared which is best adapted for each particular use to which the abrasive product is to be applied.

While I have described my invention with particular reference to certain specific materials it is to be understood that the invention is not limited to the particular materials and methods herein referred to.

I claim:

1. An abrasive article comprising abrasive grains and a binder therefor comprising the neutralization product of an alkali with a heteropolymer of an olefinic acid and a compound containing the vinyl group.

2. An abrasive article comprising abrasive grain and a binder therefor comprising the neutralization product of an alkali with a heteropolymer of styrene and maleic anhydride.

3. An abrasive article comprising abrasive grain and a binder therefor comprising the neutralization product of an alkali with a heteropolymer of styrene, vinyl acetate and maleic anhydride.

4. An abrasive article comprising abrasive grain and a binder therefor comprising the neutralization product of an alkali with a heteropolymer of vinyl acetate and maleic anhydride.

5. An abrasive article comprising abrasive grain and a binder therefor comprising the neutralization product of an alkali with a heteropolymer of an olefinic acid and methyl methacrylate.

6. An abrasive article comprising abrasive grain and a binder therefor comprising the neutralization product of an alkali with a heteropolymer of maleic anhydride and methyl methacrylate.

NORMAN P. ROBIE.